(12) United States Patent
Hazenbroek et al.

(10) Patent No.: US 6,599,179 B1
(45) Date of Patent: Jul. 29, 2003

(54) GULLET CUTTER

(75) Inventors: Jacobus Eliza Hazenbroek, Klaaswaal (NL); Willem Cornelis Steenbergen, Numansdorp (NL); Dirk Cornelis Stooker, 'S-Gravendeel (NL)

(73) Assignee: Systemate Group, B.V., Numansdorp (NL)

(*) Notice: Subject to any disclaimer, the term of this patent is extended or adjusted under 35 U.S.C. 154(b) by 0 days.

(21) Appl. No.: 09/705,047

(22) Filed: Nov. 2, 2000

(30) Foreign Application Priority Data

Nov. 3, 1999 (NL) .............................. 1013471

(51) Int. Cl.⁷ ..................... A22B 5/18; A22C 21/06; A22C 25/14
(52) U.S. Cl. ............................................. 452/117
(58) Field of Search .................. 452/117, 106, 452/118

(56) References Cited

U.S. PATENT DOCUMENTS

| | | | | |
|---|---|---|---|---|
| 2,512,290 A | * | 6/1950 | Spang | 452/117 |
| 3,685,096 A | * | 8/1972 | Harben, Jr. | 452/118 |
| 3,724,032 A | * | 4/1973 | Harben, Jr. | 452/63 |
| 4,262,387 A | * | 4/1981 | Scheier et al. | 452/117 |
| 4,574,427 A | * | 3/1986 | Harben et al. | 452/117 |
| 4,610,050 A | * | 9/1986 | Tieleman et al. | 452/117 |
| 5,707,280 A | * | 1/1998 | Tieleman et al. | 452/117 |
| 6,227,960 B1 | * | 5/2001 | Martin et al. | 452/117 |
| 6,280,310 B1 | * | 8/2001 | Landel | 452/117 |

\* cited by examiner

*Primary Examiner*—Charles T. Jordan
*Assistant Examiner*—Judith A. Nelson
(74) *Attorney, Agent, or Firm*—Thomas, Kayden, Horstemeyer & Risley

(57) ABSTRACT

When the stomach, intestines, and other viscera have been pulled from the visceral cavity of a bird traveling in series with other birds on a suspended conveyor line, the gullet holds the viscera in a position suspended outside of the bird where it can be inspected by a health official. The gullet cutter 20 is moved downwardly by its cam roller following the sloped cam track 15 until its tube 1 and rod 2 reach into the visceral cavity of a bird. The rod 2 that is inserted into the visceral cavity and its hook-shaped protrusion 5 are rotated by gear wheels 8, 21, 22 to create a scissors-cutting effect between the protrusion 5 and its notch 4 to cut the gullet. During cutting, the bird is urged by a rotatable bracket 10 into a desired position so that the gullet of the bird is urged into the hook-shaped protrusion, effecting an accurate cut of the gullet by the protrusion.

39 Claims, 4 Drawing Sheets

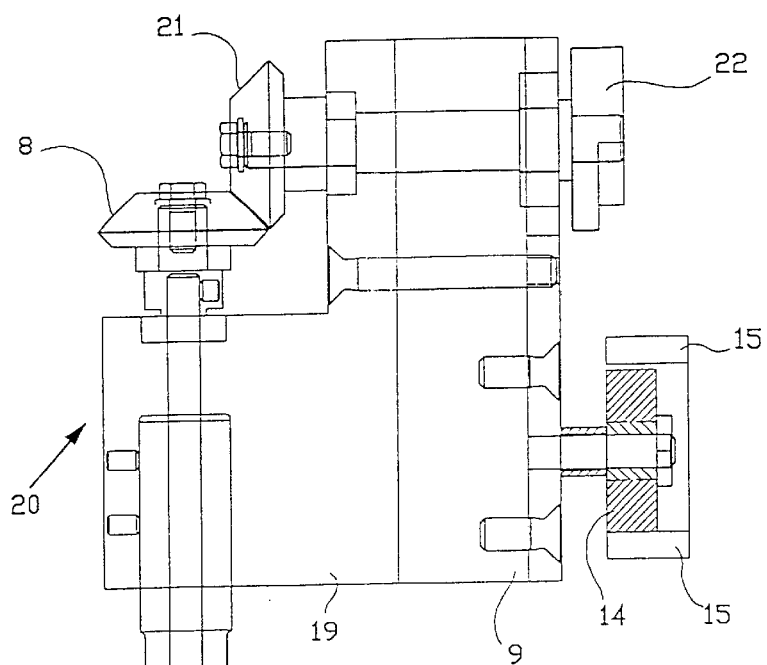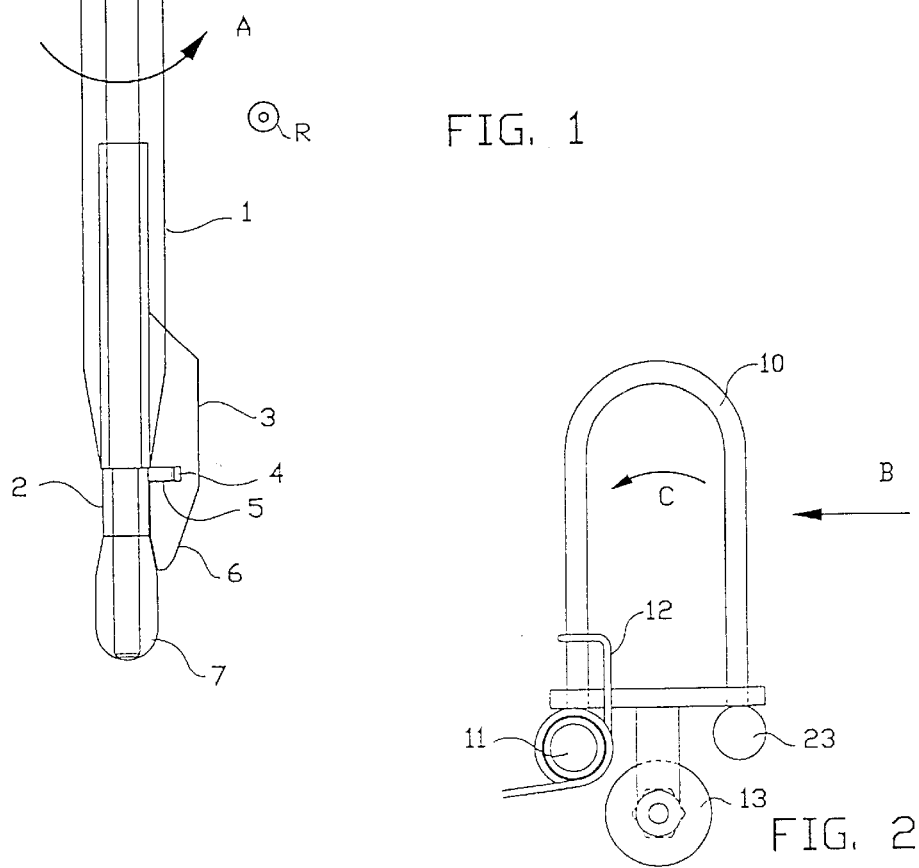
FIG. 1
FIG. 2

GULLET CUTTER

FIELD OF THE INVENTION

The invention relates to a device for carrying out a treatment of carcasses of slaughtered poultry, in particular removing the connection of a packet of entrails to the carcass via the gullet.

The invention further relates to a method for carrying out such a treatment on the carcasses of slaughtered poultry.

BACKGROUND

A treatment of the kind mentioned above, up until now has been carried out manually when the packet of entrails of slaughtered poultry, for instance a slaughtered chicken, is eviscerated by an eviscerator and the packet of entrails is hanging outside of the poultry. The packet of entrails is then still attached to the carcass by fat and the gullet. When the packet of entrails has to be removed the packet of entrails is manually pulled away as a result of which the gullet is torn away. The drawback occurring here is that the rupture in the gullet is not always realised at the wanted location. Often the gullet ruptures just before the gizzard, as a result of which the contents of the stomach can spread in the poultry. It is also disadvantageous that for tearing away the gullet, force is needed and relatively a lot of time.

SUMMARY OF THE INVENTION

It is an object of the invention to provide a device and method with which said drawbacks are solved.

To that end a device of the above-mentioned kind according to the invention is characterized by cutting means for cutting the gullet in the carcass, in which means are provided for inserting the cutting means into the carcass, in which furthermore means are provided for engaging about the gullet.

In this manner the gullet can but cut through at a same determined location within the carcass. Less force is necessary for detaching the packet of entrails later on because the packet of entrails is merely attached to the carcass by fat, which is easy to rupture. Less time is then also needed for removing the packet of entrails.

From another aspect the invention provides a device for cutting through the gullet in poultry by scissor-like means. Preferably the device is provided with scissor means, comprising a gullet engager provided with a first cutting edge and second cutting edge cooperating with it.

Preferably the device is adapted for being attached to a drive.

Preferably the means for engaging about the gullet comprise a gripper member which preferably can be rotated, particularly in a substantially horizontal plane. Thus the gullet, which will extend vertically, can be engaged in a simple manner. The engagement of the gullet is promoted when the gripper member is hook-shaped.

Preferably the gripper member, as seen from above, can be rotated anti-clockwise, which is advantageous in view of the position which the gullet usually has in the carcass.

Preferably the cutting means comprise a relatively stationary cutting edge. Said cutting edge can be part of a notch, in which the gripper member can move. Thus the gullet can be engaged about in a fluent, continuous movement of the gripper member, and cut through. The gripper member to that end preferably is provided with a sharp edge, promoting the gripper action and the cutting action. The notch can also form a receiving space for the gripper member in insert and/or exit position, in order to keep the profile as small as possible.

In a further development of the device according to the invention it comprises a hollow tube having a rotatable rod in it, on which hollow tube the cutting edge, in particular the notch, is provided, which rotatable rod is provided with the gripper member, in particular the hook-shaped gripper member, which extends out of the hollow tube. The rotatable rod is shielded here by the hollow tube, the gripper member, however, being free.

The cutting edge or the notch preferably is provided in a radially extending portion attached to the hollow tube.

Preferably the radially extending portion also forms a downward protrusion, for promoting the insertion into the carcass. The rotatable rod here extends out of from under the hollow tube and the rotatable rod preferably at its extremity is provided with a thickened portion for determining the location.

Alternatively the radially extending portion can form a connection between a portion of the hollow tube situated above the gripper member and a portion situated below it. The lower portion of the hollow tube here can form a shield and bearing for the rotatable rod, and moreover form a pilot or insertion end of the device.

The radially extending portion can form trapezium-shaped elevation, and preferably is provided with a pilot surface.

The means for rotating the rotatable rod with respect to the hollow tube may be manually, electrically, pneumatically or hydraulically operated. In a further development means are provided for moving the gullet into the path of movement of the engagement means. In this way it can be ensured that the engagement means will actually engage about the gullet.

In slaughter line arrangement in which the devices according to the invention are arranged in series on a circumferential frame, for instance in shape of a carousel, it is preferable when the aforementioned movement means are arranged on the frame outside the cutting device. In this way the cutting device can be kept simple.

Preferably the movement means are also arranged in series, each accompanying a cutting device. Preferably the movement means are positioned in order to engage the outer side of the carcass.

To that end a rotatable pushing means, such as a rod is provided, which preferably engages between the legs of the carcass hanging from the legs, in which the rod is arranged in a moveable manner for exerting a pushing force on the carcass, in particular a leg. The rod to that end preferably can be rotated, in particular about a vertical axis, in which it is advantageous when the rod is moveable counter to a spring force.

Preferably the pushing means can be rotated anti-clockwise, taking the position the gullet usually takes in the carcass into account.

Preferably the pushing means is part of a bracket, which extends between the legs of the carcass. The bracket here can be formed in order to provide a vertical passage for the cutting device.

Preferably the gripper member is positioned in order to at the start of its rotation be moved away from the frame, in a carousel arrangement radially to the outside, and the movement means, such as the bracket, has brought the gullet in the path of the gripper member by tilting the carcass.

The invention also provides an assembly for engaging about and cutting through the gullet of poultry, comprising a conveyor for the carcasses of the poultry according to a slaughter path and means for moving the devices as described above along with the carcasses.

The invention further provides a method for cutting through the gullet of poultry, characterized in that a device as described above is used, in which the device is inserted into the carcass of slaughtered poultry, in which subsequently the gullet is engaged about and cut through by scissor means, after which the device is removed out of the poultry.

The invention also provides a method for cutting through the gullet of poultry, characterized in that an assembly as described above is used, in which the device is inserted in the carcass of slaughtered poultry, in which subsequently the gullet is engaged about and cut through by scissor means, after which the device is removed out of the poultry.

In a further development the carcass is tilted prior to engaging about the gullet in order to bring the gullet in the path of a means, with which the gullet is engaged about.

BRIEF DESCRIPTION OF THE DRAWINGS

An exemplary embodiment of the invention will below be described by way of example on the basis of the drawings, in which:

FIG. 1 is an elevational view on the exemplary embodiment according to the invention.

FIG. 2 is a top view on an exemplary embodiment of a bracket according to the invention.

FIG. 5 shows the exemplary embodiments according to FIG. 1, attached to a carousel in which the gullet of slaughtered poultry is cut through.

DETAILED DESCRIPTION

Figure 3:
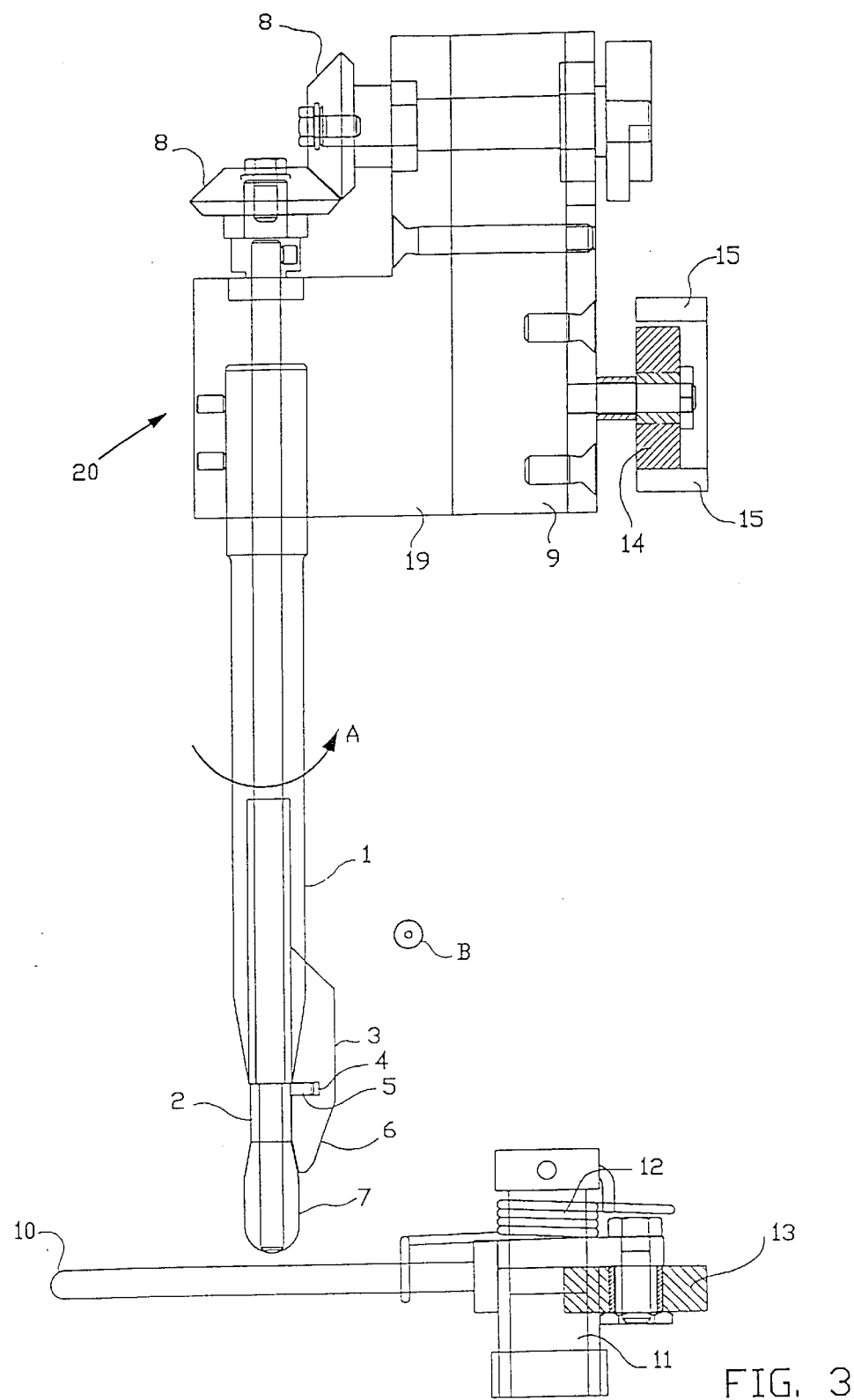
FIG. 3 is a view of the exemplary embodiment according to FIG. 1 in combination with an exemplary embodiment of a bracket according to FIG. 2.

The exemplary embodiment according to FIG. 1 regards a device 20 having cutting means for cutting through the gullet in the carcass of slaughtered poultry. In particular the device is meant for cutting the gullet loose after the packet of entrails of the poultry has been eviscerated by a eviscerator and the packet of entrails is situated outside of the carcass. The packet of entrails is then only attached to the carcass by fat and by the gullet.

FIG. 1 shows a suspension block 19 having passages 9 for guiding rods (not shown) and cam roller 14 which is guided in stationary curve or cam track 15 of, for instance, a carousel. On the block 19 a hollow tube I is attached, within it a rod 2 that can be rotated anti-clockwise in the direction A. The hollow tube I is provided with an elevation 3 extending radially and downward and having a notch 4. The rotatable rod 2 is provided with a hook-shaped protrusion 5. Hook-shaped protrusion 5 is provided with a sharp edge in order to cut well. The hook-shaped protrusion 5 can also be rotated in a horizontal plane in order to be moved snugly through the notch 4 in order to thus cut through the gullet. The elevation 3 is trapezium-shaped and is provided with a pilot edge or pilot surface 6.

Preferably the hook-shaped protrusion 5 and the elevation 3 are made of hardened steel so that a good cutting action remains guaranteed also after very many cutting treatments.

At one of its extremities the rotatable rod 2 is provided with a thickened portion 7. The thickened portion 7 facilitates a correct positioning of the hollow tube 1 and the rotatable rod 2 in the carcass of slaughtered-poultry.

Rotating the rotatable rod 2 with respect of the hollow tube 1 takes place by means of the toothed wheels 8, 21, 22, in which the toothed wheel 22 is driven on a stationary rack.

Cutting through the gullet of slaughtered poultry now takes place as follows: the poultry is brought under the device 20 hanging from the legs, with the breast facing the frame. Subsequently the hollow tube 1 and the rotatable rod 2 are lowered into the carcass of the slaughtered poultry, by moving the block 19 and the hollow tube 1 and the rotatable rod 2 in the carcass in the vertical direction, until the hook-shaped protrusion is situated closely above the neck. Subsequently the rotatable rod 2 is brought into rotation and the gullet is engaged about by the rotating hook-shaped protrusion 5, taken to the notch 4 and cut through by scissor means by cooperation with its sharp edge.

Rotating the rotatable rod 2 and therefore the hook-shaped protrusion 5 is caused by driving the toothed wheel 22, which drives the toothed wheel 21 and thus the other toothed wheel 8, which is connected to the rotatable rod 2.

After cutting through the gullet the hollow tube 1 and the rotatable rod 2 are removed out of the carcass, by moving the block 19 and thus the hollow tube 1 and the rotatable rod 2 in the vertical direction upward with respect to the carcass.

In the manner described above the gullet is cut through at a wanted location, close to the neck. The packet of entrails, on which also the part of the gullet that is cut off by scissor means is attached, is now only attached to the slaughtered poultry by fat. Detaching the packet of entrails which is only attached to the carcass by fat takes far less force than detaching the packet of entrails attached to the carcass by fat and the gullet and can take place easily in a further stage in the process by diverging paths. Moreover cutting through the gullet takes place more quickly than manually tearing the gullet away. A lot of reductions can therefore by made as to deploying personnel.

The above-mentioned device 20 can be accommodated in series in a slaughter line, for instance in a carousel, in which an overhead conveyor for the carcasses of the poultry is guided past the carousel. Cutting through the gullet with the assembly now takes place in the same manner as described above. Here the poultry will be supplied with the breast in the direction of the center line of the carousel and run in that way.

FIG. 2 shows a rotatable leg bracket 10. Said rotatable bracket 10 is provided for tilting the carcass in a horizontal plane in order to bring the gullet, if necessary, in the rotation path of the hook 4. This may be necessary because the gullet will not always be sufficiently close to the center of the carcass, but seen in operation direction, a little behind the cutting device. The rotatable bracket 10 can be rotated or tilted anti-clockwise, in direction C about a rod 11 and pre-stressed to the indication position, supporting against the rod 23, by means of torsion spring 12. The rods 11 and 23 can also be guides for the block 19.

At the frame side, the rotatable bracket 10 is provided with a roller 13, which contacts a circumferential track on the frame, which track comprises portions that are situated radially to the outside. Because of spring action the abutment of the roller 13 against the track is always guaranteed and the bracket 10 automatically moves back when the elevation of the track stops. The rotation movement of the bracket 10 as opposed to a translation movement of the bracket 10 has the advantage that it is prevented that the gullet contacts the outer side of the hook-shaped protrusion 5 (also see the description of FIG. 4). The orientation of the rotatable bracket 10 is such that the plane defined by the U-shaped bracket 10 is perpendicular to the centre line of the hollow tube 1 and rotatable rod 2 of FIG. 2.

FIG. 3 shows the device from FIG. 1 in combination with the rotatable bracket 10. The location of the rotatable bracket 10 can be such that the hollow tube 1 and the rotatable rod 2 extend through the bracket 10.

Figure 4:
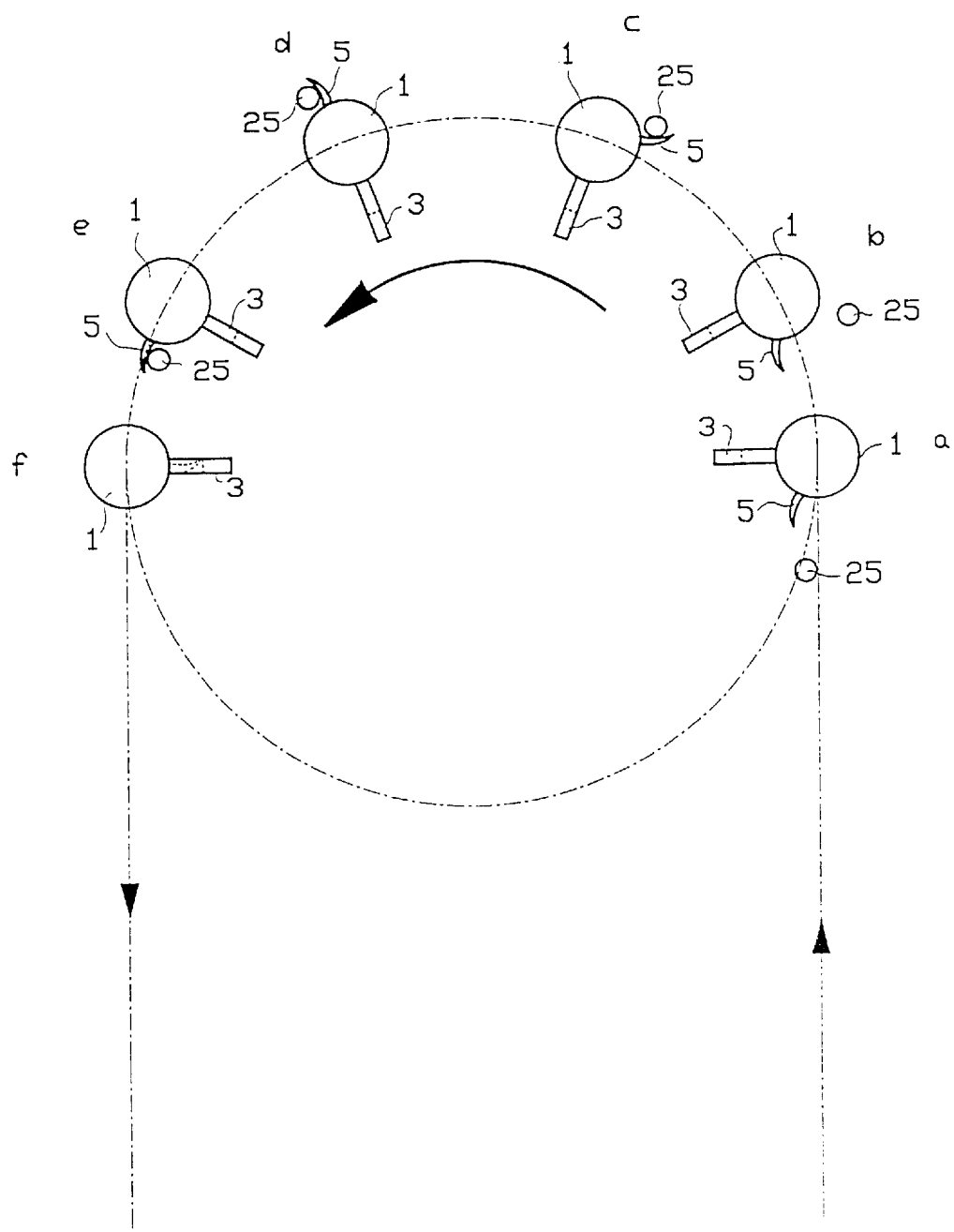
FIG. 4 is a top view on an exemplary embodiment in which exemplary embodiments according to FIG. 1 rotate according to the rotating movement of a carousel.

FIG. 4 shows a schematic top view on an exemplary embodiment in which exemplary embodiments according to FIG. 1 are attached to a carousel rotating in process direction B. The top view is shown at the level of the hook-shaped protrusion 5 and the elevation 3. The gullet 25 is initially situated out of reach of the hook-shaped protrusion 5 and downstream of the cutting device as appears from the position a in FIG. 4. In order to bring the gullet 25 within reach of the hook-shaped protrusion 5 the bracket is rotated; the gullet 25 is then positioned as indicated by b. Because the bracket is rotated in direction C, the carcass is tilted relatively to the fore and to the outside and the gullet 25 moves more towards the device 20 and somewhat radially to the outside. Subsequently, as indicated by c, the hook-shaped protrusion 5 is rotated, initially in radial direction to the outside with respect to the carousel. Said rotation is continued, as indicated by c, d, e in order to engage about the gullet 25, rotate it along and cut it through, as indicated by f, where the hook-shaped protrusion 5 is moved through the notch in the elevation 3. Cutting through the gullet 25 is now completed and the cutting device can now be moved out of the chicken. The rotation direction of the hook-shaped protrusion 5 can be the same as the rotation direction of the carousel.

Figure 5:
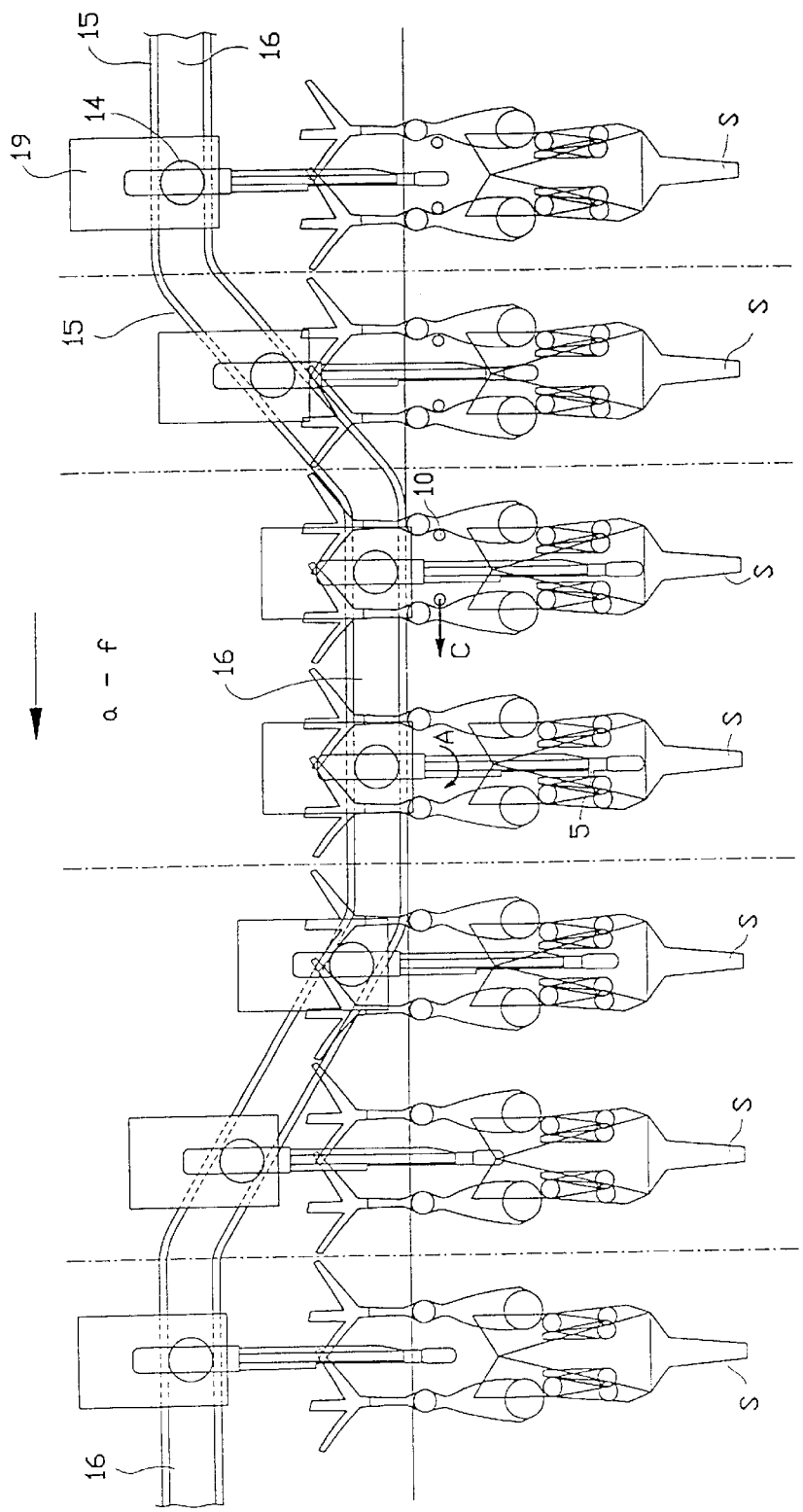

FIG. 5 shows an exemplary embodiment according to FIG. 1, attached to a carousel in which the gullet of slaughtered poultry is cut through. The carcass S hangs with the breast facing the inner side of the carousel and the back facing the outer side. First the device 20 is moved downwards in the carcass 21 of the slaughtered poultry. The device 20 is moved in and out of the carcass 21 of slaughtered poultry because the device 20 follows a curved track 15. After that the rotation in the bracket takes place in the direction C. Subsequently the rotatable rod 2 is rotated in the direction A and the gullet is cut through. After that the bracket 10 can tilt back. Finally the device 20 is lifted again in the run out.

What is claimed is:

1. A device for carrying out a treatment of carcasses of slaughtered poultry, comprising a holder, a hollow tube mounted to said holder having a rotatable rod therein, cutting means mounted to said hollow tube configured for insertion into the carcass and for cutting through the gullet while in the carcass, means for inserting the cutting means into the carcass rotably mounted to the holder, and means for engaging about the gullet mounted to said rod.

2. A device according to claim 1, wherein the means for engaging about the gullet comprise a gripper member.

3. A device according to claim 2, wherein the gripper member can be rotated in a substantially horizontal plane.

4. A device according to claim 3, wherein the gripper member is a part of the cutting means.

5. A device according to claim 4, wherein the gripper member is positioned so that at the start of its rotation for engaging about and cutting through the gullet, it moves in radial direction to the outside with respect to a rotating propelling direction of the cutting member.

6. A device according to claim 1, wherein the cutting means comprise a relatively stationary cutting edge in order to form a scissor means with the gripper member.

7. A device according to claim 6, wherein the cutting edge is part of a notch in which the gripper member can move.

8. A device according to claim 7, comprising a hollow tube having a rotatable rod in it, on which hollow tube the cutting edge, in particular the notch, is provided, which rotatable rod is provided with the gripper member, in particular a hook-shaped gripper member, which extends out of the hollow tube.

9. A device according to claim 8, wherein the cutting edge is provided in a radially extending portion attached to the hollow tube.

10. A device according to claim 9, wherein the radially extending portion also forms a downward protrusion.

11. A device according to claim 10, wherein the rotatable rod extends out of from under the hollow tube and preferably forms a thickened end, in particular for determining the location.

12. A device according to claim 8, wherein the means for rotating the rotatable rod with respect to the hollow tube are electric, pneumatic or hydraulic.

13. A device for cutting through the gullet in poultry comprising a suspension block, a rod rotatably mounted to said suspension block and having a distal end, a scissors cutter mounted on said distal end, a cam track for lowering and raising said scissors cutter into and out of the visceral cavity of a bird, and toothed wheel means mounted on said rod for rotating said rod and cutting a gullet of the bird with said scissors cutter.

14. A device according to claim 13, wherein said scissors cutter comprises a gullet engager provided with a first cutting edge and a second cutting edge cooperating with it.

15. An assembly of a frame and a device arranged on it, the device comprising cutting means configured for insertion into the carcass and for cutting through the gullet while in the carcass, means for inserting the cutting means into the carcass, and means for engaging about the gullet, furthermore provided with movement means for moving the gullet into the path of movement of the engagement means.

16. An assembly according to claim 15, wherein said movement means are arranged on the frame, outside of the cutting device.

17. An assembly according to claim 16, wherein several devices according to claim 1 are arranged on the frame in series, wherein also the movement means are arranged in series, each accompanying a cutting device.

18. An assembly according to claim 17, wherein the movement means are positioned to engage the outside of the carcass.

19. An assembly according to claim 18, wherein a rotatable pushing means in the form of a rod is provided, which engages between the legs of the carcass hanging from the legs, wherein the rod is arranged in a moveable manner for exerting a pushing force on the leg of a carcass.

20. An assembly according to claim 19, wherein the rod is arranged in a rotatable manner, in particular about a vertical axis.

21. An assembly according to claim 20 and further including a spring, wherein the rod can be moved counter to a spring force.

22. An assembly according to claim 19, wherein the pushing means is part of a bracket for extending between the legs of the carcass.

23. An assembly according to claim 22, wherein said bracket is formed in order to provide a vertical passage for the cutting device.

24. An assembly for engaging about and cutting through the gullet of poultry, comprising a device having cutting means configured for insertion into the carcass and for cutting through the gullet while in the carcass, means for inserting the cutting means into the carcass, and means for engaging about the gullet, a conveyor for the carcasses of the poultry according to a slaughter path and means for moving the devices along with the carcasses, as well as means for driving the gripper means.

25. A method of cutting through the gullet of slaughtered poultry, wherein scissor means are inserted into the carcass, wherein subsequently the gullet is engaged about and cut through by scissor means, after which the scissor means are removed out of the poultry.

26. A method according to claim 25, wherein when engaging the gullet is conveyed to a counter cutting means.

27. A method according to claim 25, wherein the carcass is being tilted in order to bring the gullet in the path of a gripper means, subsequently the gullet being engaged about by the-gripper means and taken to a cutting means and is cut through there by scissor means in a continuous movement, after which the device is removed out of the poultry.

28. A method according to claim 27, wherein the tilting and the movement of the gripper means both take place anti-clockwise.

29. An assembly of a frame and a device according to claim 13 arranged on it, furthermore provided with means for moving the gullet into the path of movement of the engagement means.

30. An assembly according to claim 29, wherein a gripper member is positioned in order to at the start of its rotation be moved away from the frame, in a carousel arrangement radially to the outside, and a movement means is positioned in order to bring the gullet in the path of the gripper member by tilting the carcass.

31. Assembly for engaging about and cutting through a gullet of poultry, comprising a conveyor for the carcasses of the poultry according to a slaughter path and means for moving the devices according to claim 13 along with the carcasses, as well as means for driving a gripper means.

32. A device for carrying out a treatment of slaughtered poultry carcasses as the carcasses are transported in spaced series along a processing path suspended by the legs of the carcasses and the viscera of each carcass pulled from the visceral cavity and suspended on the exterior of the carcass by the gullet of the carcass, said device comprising:

a carousel including stations for receiving each carcass;

each station including a tube for insertion into the visceral cavity of a carcass;

a cam system for inserting-and withdrawing said tube with respect to the visceral cavity of a carcass;

a cutter supported by said tube at a position for cutting the gullet of the carcass when said tube is inserted into the visceral cavity of a carcass;

means for moving said cutter into cutting engagement with the gullet of a carcass when said tube and said cutter are inserted into the visceral cavity of a carcass; and means for engaging the exterior of a carcass and for urging the carcass laterally to move the gullet in the visceral cavity of the carcass toward engagement with said cutter.

33. The device of claim 32, wherein said means for engaging the exterior of a carcass comprises a bracket and a cam for urging said bracket into engagement with the carcass.

34. The device of claim 33, and further including a spring adapted to move said bracket away from the carcass when the gullet has been cut by said cutter.

35. The device of claim 2, wherein the gripper member is hook shaped.

36. The device of claim 2, wherein the gripper member is comprised of hardened steel.

37. The device of claim 3, wherein the gripper member can be rotated anti-clockwise.

38. The device of claim 4, wherein the gripper member further includes a sharp edge.

39. A gullet cutter comprising:

a carousel for placement along a poultry processing line, a suspension block for revolving about said carousel, said carousel including a cam track for raising and lowering said suspension block in response to said suspension block revolving about said carousel, an elongated rod member carried by said suspension block and having a longitudinal axis and a distal end extending downwardly from said-suspension block for movement into and out of a previously eviscerated cavity of a bird suspended by its legs below said suspension block, at least one toothed wheel carried by said suspension block for rotating said rod about its longitudinal axis, and a cutter supported by said distal end of said rod and rotatable with said rod by said toothed wheel for cutting the gullet from the visceral cavity of the bird suspended below said suspension block.

* * * * *